United States Patent
Ando (10) Patent No.: US 9,143,347 B2
(45) Date of Patent: Sep. 22, 2015

(54) COMMUNICATION CONTROL SYSTEM FOR VEHICLES

(75) Inventor: Masakuni Ando, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 624 days.

(21) Appl. No.: 12/461,551

(22) Filed: Aug. 14, 2009

(65) Prior Publication Data

US 2010/0082181 A1    Apr. 1, 2010

(30) Foreign Application Priority Data

Sep. 30, 2008 (JP) ................................ 2008-254096

(51) Int. Cl.
*H04L 12/40* (2006.01)
(52) U.S. Cl.
CPC . *H04L 12/40013* (2013.01); *H04L 2012/40215* (2013.01); *H04L 2012/40273* (2013.01)
(58) Field of Classification Search
CPC ............... H04L 12/40013; H04L 2012/40273; H04L 2012/40215
USPC .......................................................... 701/36
See application file for complete search history.

(56) References Cited

U.S. PATENT DOCUMENTS

| | | | |
|---|---|---|---|
| 6,230,089 B1 * | 5/2001 | Lonn et al. ....................... | 701/48 |
| 7,012,401 B2 | 3/2006 | Ohkouchi et al. | |
| 2002/0006139 A1 * | 1/2002 | Kikkawa et al. ............... | 370/502 |
| 2006/0178804 A1 | 8/2006 | Laichinger et al. | |
| 2008/0162860 A1 * | 7/2008 | Sabbatini et al. ............. | 711/170 |

FOREIGN PATENT DOCUMENTS

| | | | |
|---|---|---|---|
| CN | 1804574 | | 7/2006 |
| JP | 11-115717 | | 4/1999 |
| JP | 2003 212067 A | | 7/2003 |
| JP | 2004-299431 | | 10/2004 |
| JP | 2006287738 A | * | 10/2006 |
| JP | 2007 093425 A | | 4/2007 |
| JP | 2007 203764 A | | 8/2007 |
| KR | 20070005386 | | 1/2007 |

* cited by examiner

Primary Examiner — John Q Nguyen
Assistant Examiner — Jordan S Fei
(74) Attorney, Agent, or Firm — Squire Patton Boggs (US) LLP (57) ABSTRACT

Devices that are connected to each other by shorter distances, such as an audio switch 35 and an audio unit 21, the audio switch 35 and a volume control switch 41, a selector switch 43, and an audio mute switch 45 of a left handlebar switch unit 24, and a leveling unit 19 and a meter switch 32, a navigation panel switch 36, and an operation switch 46 of the left handlebar switch unit 24, communicate with each other by way of serial communications. Control units and vehicle-mounted devices which are connected to each other by longer distances, such as a TPMS unit 23, an FIECU 22, and a meter M, and the meter M, a leveling unit 19, a smart unit 23A, and an RVS unit 23B, communicate with each other via a CAN.

5 Claims, 6 Drawing Sheets

COMMUNICATION CONTROL SYSTEM FOR VEHICLES

BACKGROUND

1. Field

Embodiments of the present invention relate to a communication control system for vehicles.

2. Description of the Related Art

Heretofore, there has been known a communication control system including a plurality of vehicle-mounted devices and a plurality of control units for controlling the vehicle-mounted devices. The control units could be interconnected by a vehicle-mounted LAN (Local Area Network) for exchanging data therebetween. Since the LAN interconnects controllers that serve as the control units, it is referred to as a CAN (Controller Area Network), and is used to transfer data between the interconnected control units (see Japanese Patent Laid-open No. Hei 11-115717 and Japanese Patent Laid-open No. 2004-299431).

SUMMARY

According to one embodiment of the invention, a communication control system is provided. The system includes at least one vehicle-mounted device, and at least one control unit configured to control the at least one vehicle-mounted device. The at least one vehicle-mounted device and the at least one control unit comprise vehicle-mounted devices and control units which are connected to each other by a first distance for serial communications with each other, and vehicle-mounted devices and control units which are connected to each other by a second distance for communications with each other via a controller area network (CAN). The first distance is less than the second distance.

According to another embodiment, a method is provided. The method includes providing at least one vehicle-mounted device, and providing at least one control unit configured to control the at least one vehicle-mounted device. The at least one vehicle-mounted device and the at least one control unit comprise vehicle-mounted devices and control units which are connected to each other by a first distance for serial communications with each other, and vehicle-mounted devices and control units which are connected to each other by a second distance for communications with each other via a controller area network (CAN). The first distance is less than the second distance.

According to another embodiment, a communication control system is provided. The system includes at least one vehicle-mounted device, and control means for controlling the at least one vehicle-mounted device. The at least one vehicle-mounted device and the control means comprise vehicle-mounted devices and control means which are connected to each other by a first distance for serial communications with each other, and vehicle-mounted devices and control means which are connected to each other by a second distance for communications with each other via a controller area network (CAN). The first distance is less than the second distance.

According to another embodiment, a control unit is provided. The control unit includes at least one controller configured to control at least one vehicle-mounted device. The at least one vehicle-mounted device and the controller comprise vehicle-mounted devices and controllers which are connected to each other by a first distance for serial communications with each other, and vehicle-mounted devices and controllers which are connected to each other by a second distance for communications with each other via a controller area network (CAN). The first distance is less than the second distance.

BRIEF DESCRIPTION OF THE DRAWINGS

For proper understanding of the invention, reference should be made to the accompanying drawings, wherein.

DETAILED DESCRIPTION

A control system, according to one embodiment, may be implemented, in part, using a Controller Area Network (CAN) used to transfer data between interconnected control units. For realizing the CAN, the control units interconnected by the CAN have respective CAN communication circuits (CAN controllers). As more electronic devices to be controlled are involved, the number of CAN communication circuits required by the respective electronic devices increases. Therefore, the communication control system requires more installation space, resulting in an unavoidable increase in the weight and cost thereof.

The control units that are individually connected to the network pose other problems in that, since data frames which may only be transmitted between relevant devices need to be sent to the network, the processing load tends to become so large that the frequency of communication arbitration increases and the communication rate decreases.

Embodiments of the present invention provide a communication control system for vehicles which has a reduced installation space, is manufactured at a reduced cost, and undergoes a reduced network load.

Figure 1:
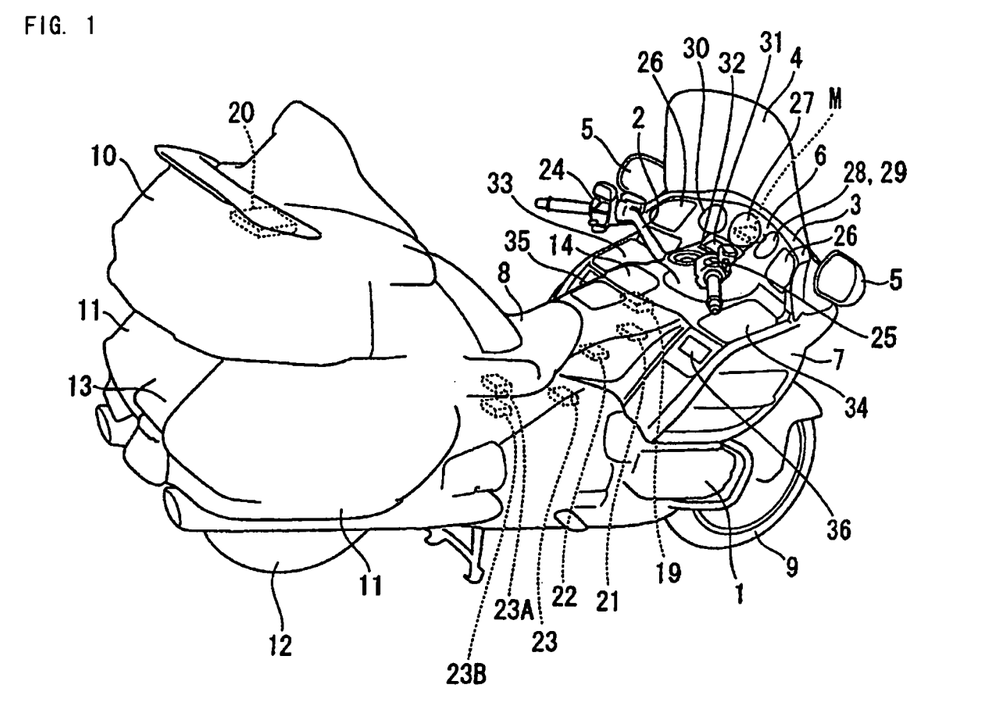
FIG. 1 is a perspective view of a motorcycle according to an embodiment of the present invention.

An embodiment of the present invention will be described below with reference to the drawings. FIG. 1 shows a motorcycle as a vehicle having a water-cooled four-stroke engine 1 with horizontally opposed six cylinders. A windscreen garnish or frame 3 is disposed in front of a handlebar 2 for steering a front wheel 9, and a windscreen 4 is mounted on an upper end of the windscreen garnish 3. Rearview mirrors 5, 5 are mounted on respective left and right sides of the windscreen garnish 3. A meter or display panel 6 is disposed on an inner surface of the windscreen garnish 3.

A front cowl 7 is attached to a lower end of the windscreen garnish 3 and extends along the opposite sides of a front portion of the vehicle body. A trunk 10 is disposed behind a rider's seat 8, and left and right saddle bags 11, 11 are disposed beneath the opposite sides of the trunk 10. A rear fender 13 disposed beneath the trunk 10 covers a rear portion of a rear wheel 12. A top shelter or cover 14 extends from a rear portion of the front cowl 7 to a front portion of the rider's seat 8.

The trunk 10 can accommodate a navigation unit 20 therein. The navigation unit 20 may receive radio waves from a GPS or radio waves from satellite radio broadcasts and output audio and video data. An audio unit 21 and an FIECU 22 as an engine control unit are disposed below the shelter 14. The audio unit 21 outputs audio data and audio data from the satellite radio broadcasts, and the FIECU 22 controls an amount of fuel injected into the engine 1 and also controls ignition timing for the engine 1.

Figure 6:
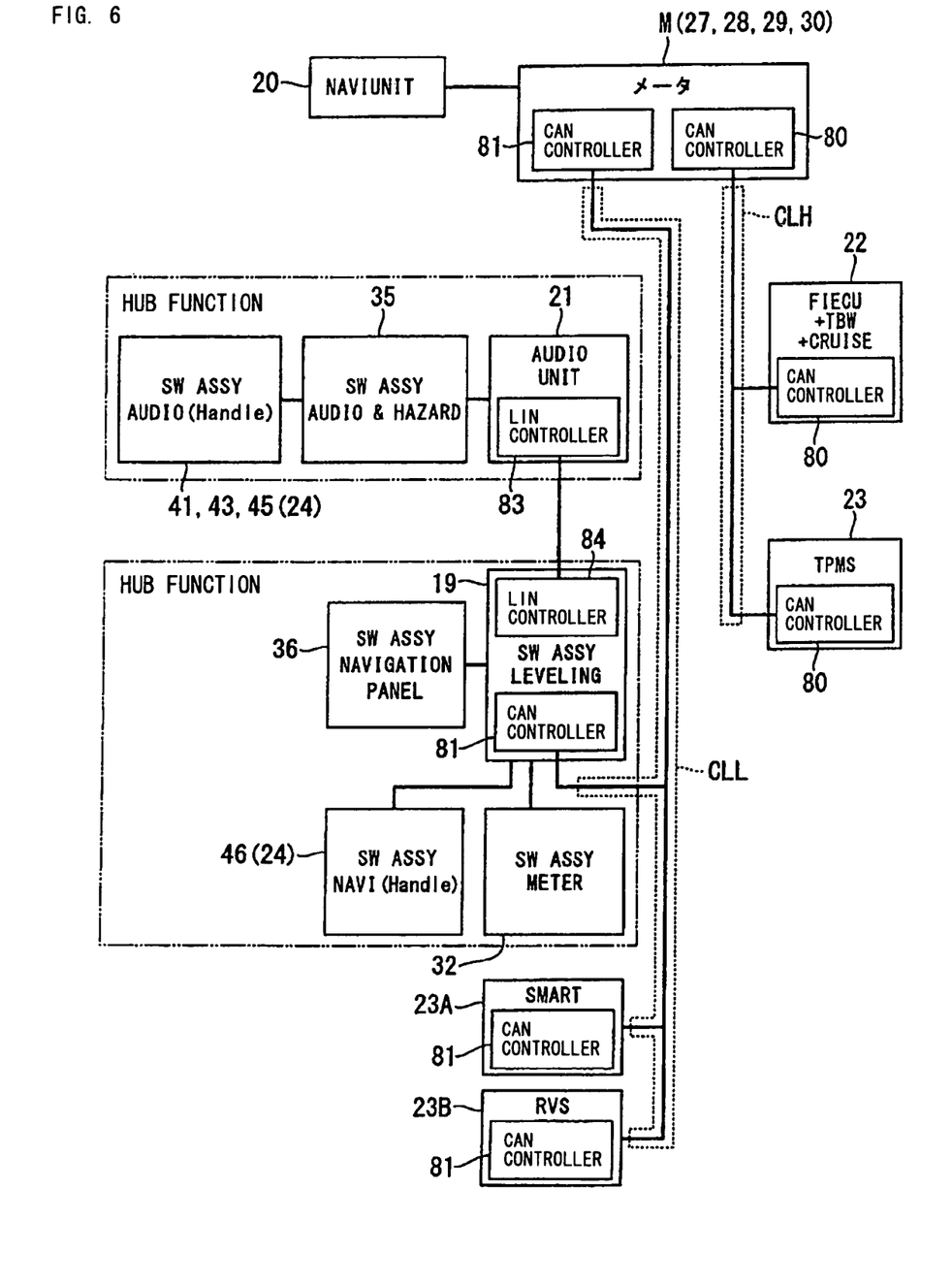
FIG. 6 is a block diagram showing communication configurations according to one embodiment.

The FIECU 22 is combined with a throttle-by-wire controller (TBW) for setting a throttle valve opening based on a detected signal representative of a grip opening, and a cruise controller (CRUISE) (see FIG. 6).

A leveling unit (SW ASSY LEVELING) 19 is disposed below the shelter 14. In response to input signals from various switches, the leveling unit 19 outputs signals to corresponding devices.

A TPMS (Tire Pressure Monitoring System) unit 23 is disposed below the shelter 14. The TPMS refers to a system for monitoring the pneumatic pressures of tires.

A smart unit (SMART) 23A is disposed below the shelter 14. The smart unit 23A communicates with an ignition key which has a function to lock and unlock the trunk 10, for example. A reverse (RVS) unit 23B is disposed closely to the smart unit 23A. The reverse unit 23B can reverse the vehicle by rotating the output shaft of the engine 1 in a reverse direction with a gear rotated by a starter motor, not shown.

A left handlebar switch unit 24 is mounted on a left portion of the handle bar 2 at the base of a grip, and a right handlebar unit 25 is mounted on a right portion of the handle bar 2 at the base of a grip. The right handlebar unit 25 may include a starter switch, a reverse shift switch, a kill switch, and a cruise control switch, etc.

The meter or display panel 6 may include speakers 26, 26 on left and right end portions thereof, and may also include a central speedometer 27 between the speakers 26, 26, a coolant temperature gauge 28 and a fuel gate 29 which are disposed on the right side of the speedometer 27, and a tachometer 30 which is disposed on the left side of the speedometer 27.

A display unit 31 is disposed on a lower portion of the meter panel 6. The display unit 31 may display various pieces of information such as navigation information, satellite broadcast information, etc. A meter switch (SW ASSY METER) 32 is disposed beneath the display unit 31.

The top shelter 14 may have a raised transversely central portion, an L cowl pocket 33 disposed in an upper surface of a left side portion thereof, and an R cowl pocket 34 disposed in an upper surface of a right side portion thereof.

The top shelter 14 can include a portion slanted downwardly behind the L cowl pocket 33 and supporting an audio switch (SW ASSY AUDIO & HAZARD) 35 thereon. The top shelter 14 may also include a portion slanted downwardly behind the R cowl pocket 34 and supporting a navigation panel switch (SW ASSY NAVIGATION PANEL) 36 thereon.

Figure 2:
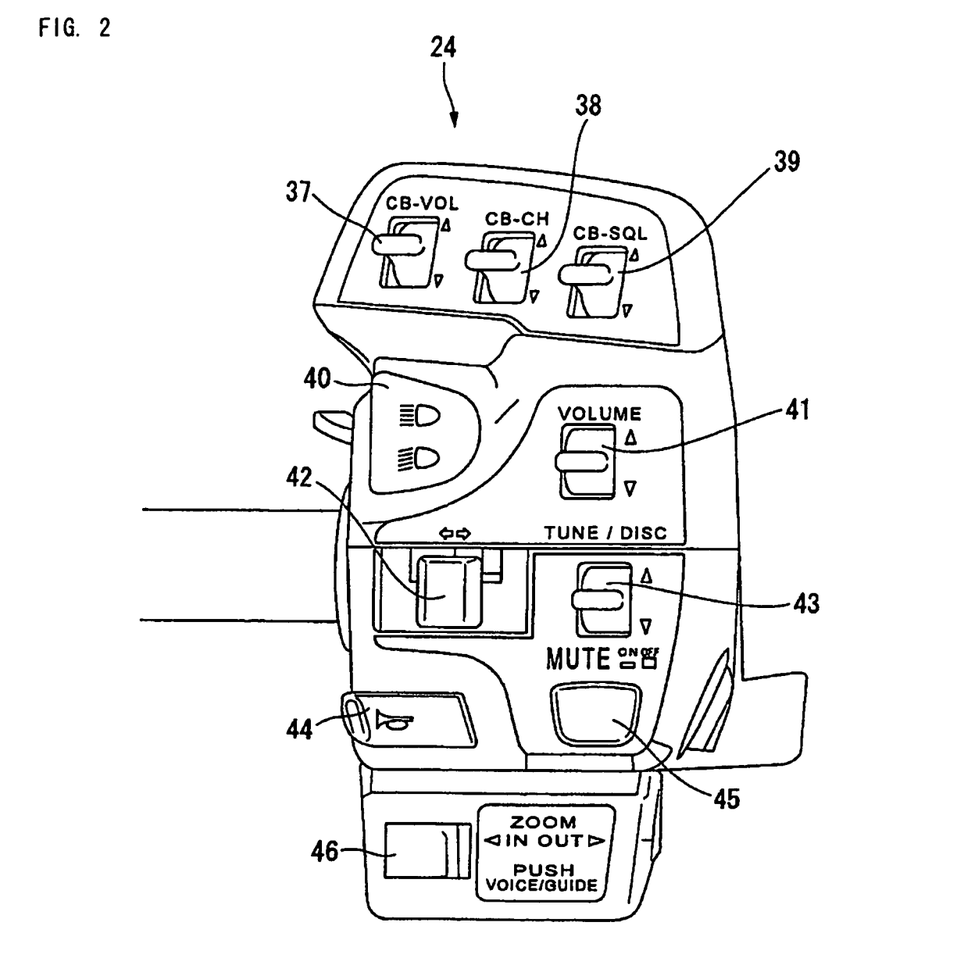
FIG. 2 is a perspective view of a left handlebar switch unit according to one embodiment.

FIG. 2 shows the left handlebar switch unit 24. The left handlebar switch unit 24 may include radio switches (CB-VOL, CB-CH, CB-SQL) 37 through 39 disposed on an upper portion thereof, a dimmer switch 40 disposed on a left side of a middle upper portion thereof for switching between high and low beams for head lamps, and a lever-type volume (VOLUME) control switch 41 on a right side of the middle upper portion for adjusting the volume of the audio unit 21 and the navigation unit 20. The left handlebar switch unit 24 may also include a turn indicator switch 42 on a left side of a middle central portion thereof and a selector switch (TUNE/DISC) 43 for the audio unit 21 on a right side of the middle central portion thereof. The selector switch 43 can serve to select tuner frequencies and also to select CD music chapters.

The left handlebar switch unit 24 may further include a horn switch 44 disposed on a left side of a middle lower portion thereof and an audio mute switch (MUTE) 45 on a right side of the middle lower portion thereof.

The left handlebar switch unit 24 may also include an operation switch 46 disposed on a lower portion thereof for zooming (ZOOM (IN OUT)) images sent from the navigation unit 20 to the display unit 31 and performing voice guidance (PUSH VOICE/GUIDE). The operation switch 46 can function as a zoom switch for changing the magnification of displayed images when turned to the left or right, and also as a voice guidance switch when pushed.

Figure 3:
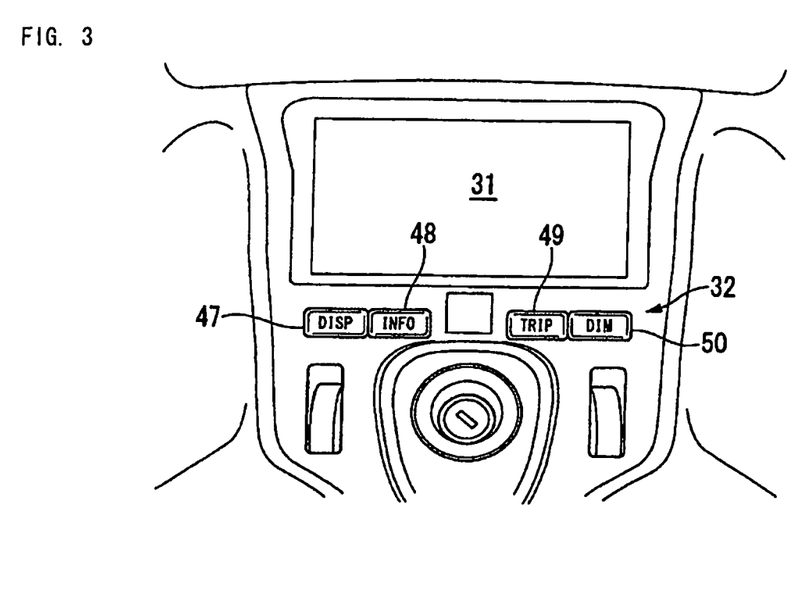
FIG. 3 is a plan view of a display unit and nearby parts according to one embodiment.

FIG. 3 shows the display unit 31 and the meter switch 32. The display unit 31 may include a liquid crystal monitor for displaying information from the navigation unit 20 and information of satellite radio broadcasts, etc. The meter switch 32, which is disposed beneath the display unit 31, may include a display switch (DISP) 47, an information switch (INFO) 48, a trip switch (TRIP) 49, and a dim switch (DIM) 50 that are successively arranged from the left.

When the display switch 47 is operated, the display unit 31 can selectively display a navigation screen and a vehicle information screen or simultaneously display both of the navigation screen and the vehicle information screen. When the information switch 48 is operated, the display unit 31 can display an ambient temperature and an adjusted rear cushion level, etc. When the trip switch 49 is operated, the display unit 31 can display information such as the traveled distance while the navigation system is in use. The dim switch 50 may be used to switch between day and night modes of the display unit 31, and also to adjust the luminance level of displayed images.

Figure 4:
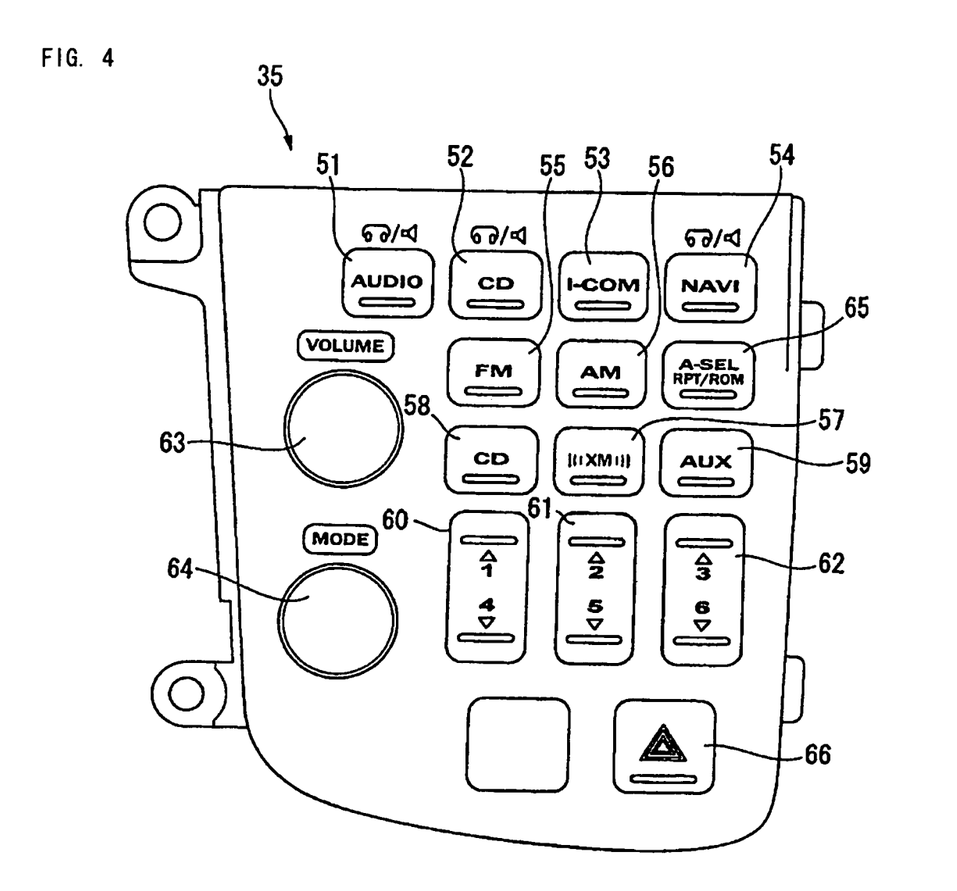
FIG. 4 is a front elevational view of an audio switch according to one embodiment.

FIG. 4 shows the audio switch 35. The audio switch 35 may include an audio switch (AUDIO) 51, a CD switch (CD) 52, a radio switch (I-COM) 53, and a navigation switch (NAVI) 54 which are disposed on a lower portion thereof. One of these switches 51 through 54 can be operated to select a corresponding sound source. The audio switch 35 may also include a tuner FM switch (FM) 55, a tuner AM switch (AM) 56, an XM satellite digital radio switch (XM) 57, a CD switch (CD) 58, and an auxiliary input switch (AUX) 59 which are disposed beneath the switches 51 through 54. The audio switch 35 may further include channel switches 60, 61, 62 disposed beneath the switches 55 through 59. On the left side of the channel switches 60, 61, 62, there are disposed a volume switch (VOLUME) 63 which may be turned or pushed and a mode switch (MODE) 64 for adjusting bass, treble, and balance levels. The audio switch 35 can also include a hazard switch 66 disposed in a lowermost portion thereof. An automatic selector switch (A-SEL) 65 for automatically selecting broadcasting stations is disposed on a right side of the FM switch 55 and the AM switch 56.

Figure 5:
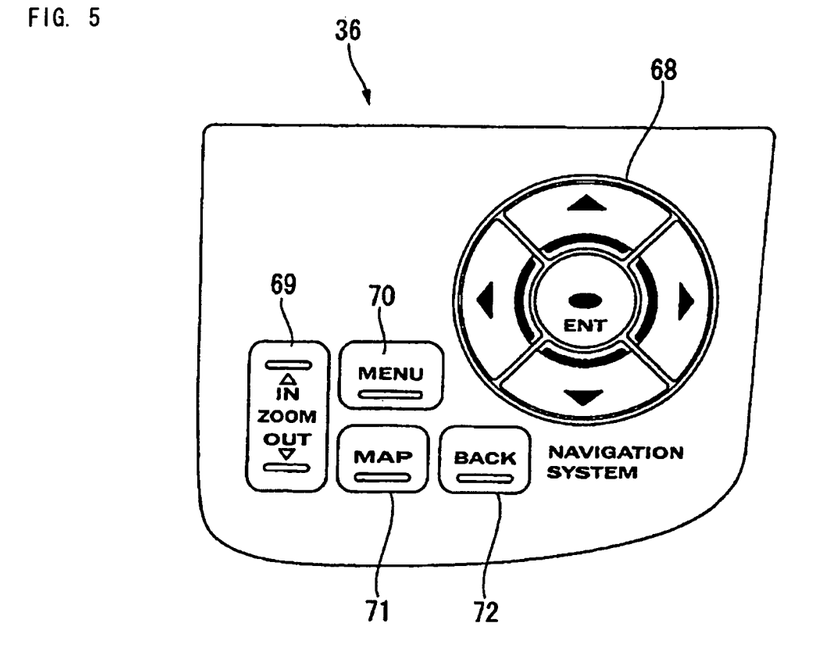
FIG. 5 is a perspective view of a navigation panel switch according to one embodiment.

FIG. 5 shows the navigation switch 36. The navigation switch 36 includes an upper/lower/left/right button 68 disposed on an upper right portion thereof for moving a cursor displayed on the display unit 31, scrolling map images displayed on the display unit 31, and scrolling lists on list screens displayed on the display unit 31. The navigation switch 36 may also includes a zoom switch (ZOOM) 69 disposed on a lower left portion thereof. The zoom switch 69 may have the same function as the zoom function of the operation switch 46 described above. The navigation switch 36 may further include a menu switch (MENU) 70 for displaying menus on the display unit 31, a map switch (MAP) 71 for displaying map screens on the display unit 31, and a back switch (BACK) 72 for displaying a screen which has been displayed immediately prior to a currently displayed screen except for map screens.

FIG. 6 is a block diagram of the communication control system for vehicles according to one embodiment.

The communication control system may include a meter M as a controller for controlling the speedometer 27, the coolant temperature gauge 28, the fuel gate 29, and the tachometer 30. The meter M can be mounted on the reverse side of the meter panel 6. The meter M may also include a pair of CAN controllers 80, 81 serving as CAN communication modules.

The CAN controller 80 is a controller for the CAN and may have a communication rate of about 500 Kbps, and the CAN controller 81 is a controller for the CAN and may have a communication rate of about 125 Kbps that is lower than the communication rate of about 500 Kbps. The two CAN controllers 80, 81 handle two groups of control units having different communication rates, i.e., a CAN communication line CLH having a higher communication rate and a CAN communication line CLL having a lower communication rate.

The CAN controller 80 with the higher communication rate, the FIECU 22 which has a similar CAN controller 80, and the TPMS unit 23 which also has a similar CAN controller 80 jointly make up the CAN communication line CLH with the higher communication rate.

The navigation unit 20 is connected to the meter M by way of serial communications using an interface such as UART (Universal Asynchronous Receiver Transmitter), for example.

The CAN controller 81 of the meter M is connected to a CAN controller 81 provided in the leveling unit 19.

The audio switch 35 may be connected to the audio unit 21 by way of serial communications. The volume control switch 41, the selector switch 43, and the audio mute switch 45 of the left handlebar switch unit 24 can also be connected to the audio switch 35.

Therefore, the audio unit 21 has a hub function for successively connecting the volume control switch 41, the selector switch 43, and the audio mute switch 45 of the left handlebar switch unit 24 to the audio switch 35.

The navigation panel switch 36 may be connected to the leveling unit 19 by way of serial communications. The meter switch 32 and the operation switch 46 of the left handlebar switch unit 24 may be connected to each other by way of serial communications.

Therefore, the leveling unit 19 has a hub function for connecting the meter switch 32, the navigation panel switch 36, and the operation switch 46 of the left handlebar switch unit 24 to the leveling unit 19.

The audio unit 21 includes a LIN (Local Interconnect Network) controller (slave) 83, and the leveling unit 19 also includes a LIN controller (master) 84. The LIN controllers 83, 84 are connected to each other for serial communications with each other.

The leveling unit 19 also has a CAN controller 81 similar to the CAN controller 81 with the lower communication rate which is included in the meter M. The CAN controller 81 of the leveling unit 19 is connected to the CAN controller 81 of the meter M, and is also connected to a CAN controller 81 included in the smart unit 23A and a CAN controller 81 included in the RVS unit 23B. The CAN controller 81 included in the meter M, the leveling unit 19 which has the CAN controller 81, the smart unit 23A which has the CAN controller 81, and the RVS unit 23B which has the CAN controller 81 jointly make up the CAN communication line CLL with the lower communication rate.

The audio switch 35 has a communication harness extending to the audio unit 21 which has a length smaller than the distances from the CAN controller 81 of the meter M to the CAN controllers 81 of the leveling unit 19, the smart unit 23A, and the RVS unit 23B in the CAN communication line CLL. The volume control switch 41, the selector switch 43, and the audio mute switch 45 of the left handlebar switch unit 24 have respective communication harnesses extending to the audio switch 35 which have respective lengths smaller than the distances from the CAN controller 81 of the meter M to the CAN controllers 81 of the leveling unit 19, the smart unit 23A, and the RVS unit 23B in the CAN communication line CLL.

The meter switch 32, the navigation panel switch 36, and the operation switch 46 of the left handlebar switch unit 24 have respective communication harnesses extending to the leveling unit 19 which have respective lengths smaller than the distances from the CAN controller 81 of the meter M to the CAN controllers 81 of the leveling unit 19, the smart unit 23A, and the RVS unit 23B in the CAN communication line CLL.

In FIG. 6, "SW ASSY AUDIO (Handle)" denoted by the reference numerals 41, 43, 45 (24) represent the volume control switch 41, the selector switch 43, and the audio mute switch 45 which are audio switches of the left handlebar switch unit 24, and "SW ASSY NAVI (Handle)" denoted by the reference numerals 46 (24) represent the operation switch 46 which is a navigation switch of the left handlebar switch unit 24.

According to one embodiment, the control units which are connected to each other by short communication harnesses, e.g., the audio switch 35 and the audio unit 21, the audio switch 35 and the volume control switch 41, the selector switch 43, and the audio mute switch 45 of the left handlebar switch unit 24, and the leveling unit 19 and the meter switch 32, the navigation panel switch 36, and the operation switch 46 of the left handlebar switch unit 24, communicate with each other by way of serial communications. Therefore, not all of the audio switch 35, the audio unit 21, the audio switch 35 and the volume control switch 41, the selector switch 43, and the audio mute switch 45 of the left handlebar switch unit 24, the leveling unit 19, the meter switch 32, the navigation panel switch 36, and the operation switch 46 of the left handlebar switch unit 24 are required to have respective CAN controllers 81. Consequently, the communication control system for vehicles according to this embodiment results in a reduced installation space, is manufactured at a reduced cost, and undergoes a reduced network load.

As a result, if the communication control system is applied to a small-size two-wheeled vehicle having a limited installation space thereon, the communication control system can be installed as a compact system on the vehicle.

Furthermore, as communication data transmitted between the control units which communicate with each other by way of serial communications are not output to the CAN communication line CLL, the frequency of communication arbitration on the CAN communication line CLL decreases and the processing load imposed on the CAN communication line CLL is reduced.

The meter M may include the two CAN controllers 80, 81 respectively for the CAN communication line CLH having the higher communication rate and the CAN communication line CLL having the lower communication rate, and the control units of different communication rates are assigned to the CAN communication line CLH having the higher communication rate and the CAN communication line CLL having the lower communication rate. Accordingly, the control units of the communication control system can process data more smoothly and efficiently, e.g., they can establish data processing timing more easily, than if the control units of different communication rates are not grouped, but are mixed together.

Furthermore, inasmuch as the leveling unit 19 and the audio unit 21 which communicate with each other by way of serial communications function as hubs, they can act as line concentrators for connecting relatively closely located devices together. The leveling unit 19 and the audio unit 21 are thus capable of collecting information and converting the collected information for CAN communications.

The leveling unit 19 and the audio unit 21 which can function as hubs, are connected to each other by the LIN controllers 84, 83. The leveling unit 19, the audio unit 21, the smart unit 23A, and the RVS unit 23B are connected to the CAN communication line CLL with the lower communication rate by the CAN controllers 81 of the leveling unit 19, the smart unit 23A, and the RVS unit 23B. Therefore, the number of CAN controllers 81 may be smaller than if all the control units for serial communications are individually connected to the CAN communication line CLL. The communication control system according to this embodiment allows an existing system made up of vehicle-mounted devices to be expanded while keeping the connections of the vehicle-mounted devices, by adding LIN controllers 83, 84. Therefore, the communication control system is versatile in that it can flexibly cope with changes in system specifications.

The present invention is not limited to the illustrated embodiments. The various devices described above as control units are shown by way illustrative example only, and the principles of the present invention are applicable to other control devices. The communication control system according to the present invention is also applicable to three-wheeled vehicles and four-wheeled vehicles rather than two-wheeled vehicles.

Embodiments of the present invention are directed to a communication control system including a plurality of vehicle-mounted devices and a plurality of control units for controlling the devices mounted on a vehicle. The vehicle-mounted devices and the control units may include vehicle-mounted devices and control units, such as an audio switch 35 and an audio unit 21, the audio switch 35 and a volume control switch 41, a selector switch 43, and an audio mute switch 45 of a left handlebar switch unit 24, and a leveling unit 19 and a meter switch 32, a navigation panel switch 36, and an operation switch 46 of the left handlebar switch unit 24 in an embodiment, which are connected to each other by smaller distances for serial communications with each other, and vehicle-mounted devices and control units, such as, a TPMS unit 23, an FIECU 22, and a metar M, and the meter M, a leveling unit 19, a smart unit 23A, and an RVS unit 23B in an embodiment, which are connected to each other by greater distances for communications with each other via a CAN (for example, a CAN communication line CLL, a CAN communication line CLH).

According to one embodiment, a plurality of CAN control units (for example, CAN controllers 80, 81 in the embodiment) may be disposed in a meter (for example, a meter M in the embodiment) and belong to the CAN. The vehicle-mounted devices and the control units may be connected to the CAN control units and assigned to respective groups handled by the CAN control units, respectively, depending on different communication rates.

In one embodiment, the vehicle includes a two-wheeled vehicle or a three-wheeled vehicle.

According to an embodiment, the vehicle-mounted devices and control units (for example, an audio unit 21 and a leveling unit 19 in the embodiment) which are connected to each other for serial communications with each other function as hubs.

In one embodiment, the vehicle-mounted devices and control units (for example, an audio unit 21 and a leveling unit 19 in the embodiment) which function as hubs have respective line control devices (for example, LIN controllers 83, 84 in the embodiment) connected to each other, and either one (for example, a leveling unit 19 in the embodiment) of the vehicle-mounted devices and control units which function as hubs can include a CAN control unit (for example, a CAN controller 81 in the embodiment) for connection to the CAN.

According to one embodiment, the vehicle-mounted devices and the control units which are mounted on the vehicle include a navigation device, an audio device, a meter device, an engine control device, and a control unit of a smart key device (for example, a navigation unit 20, an audio unit 21, a meter M, an FIECU 22, and a smart unit 23A in an embodiment).

According to certain embodiments, the control units and the vehicle-mounted devices which are connected to each other by shorter distances communicate with each other by way of serial communications. Therefore, not all the control units and the vehicle-mounted devices are required to have respective CAN control units. Consequently, the communication control system needs a reduced installation space.

Furthermore, in one embodiment, as communication data transmitted between the control units and the vehicle-mounted devices which communicate with each other by way of serial communications are not output to the CAN, the frequency of communication arbitration on the CAN decreases and the processing load imposed on the CAN is reduced.

According to one embodiment, a plurality of CAN control units and vehicle-mounted devices belonging to the CAN are disposed in a meter, and the control units and the vehicle-mounted device which are connected to the CAN control units are assigned to respective groups handled by the CAN control units, respectively, depending on different communication rates. Accordingly, the control units can process data more smoothly and efficiently, e.g., they can establish data processing timing more easily, than if the control units of different communication rates are not grouped, but are mixed together.

In one embodiment, if the communication control system is applied to a small-size two-wheeled or three-wheeled vehicle having a limited installation space thereon, the communication control system can be installed as a compact system on the vehicle.

According to one embodiment, inasmuch as at least one of the control units and the vehicle-mounted devices which communicate with each other by way of serial communications functions as a hub, it can act as a line concentrator for connecting relatively closely located devices together. At least one of the control units and the vehicle-mounted devices, which can function as a hub, is thus capable of collecting information and converting the collected information for CAN communications.

According to an embodiment, the number of CAN control units may be smaller than if all the control units and the vehicle-mounted devices are connected to the CAN. The communication control system allows an existing system made up of vehicle-mounted devices to be expanded while keeping the connections of the vehicle-mounted devices, by adding line control devices. Therefore, the communication control system is versatile in that it can flexibly cope with changes in system specifications.

According to one embodiment, the control units and the vehicle-mounted devices can be laid out while reducing the weight and cost thereof, in view of the positions of the control units and the vehicle-mounted devices and the degree to which they are related to each other.

DESCRIPTION OF REFERENCE NUMERALS

19 Leveling unit (device, control unit, vehicle-mounted device)
20 Navigation unit (control unit)
21 Audio unit (vehicle-mounted unit, control unit)
22 FIECU unit (control unit)
23 TPMS unit (control unit)
23A Smart unit (control unit)
23B RVS unit (control unit)
32 Meter switch (device)
35 Audio switch (device)
36 Navigation panel switch (device)
41 Volume (device)
43 Selector switch (device)
45 Mute switch (device)
46 Operation switch (device)
80 CAN controller (CAN control unit)
81 CAN controller (CAN control unit)
83 LIN controller (line control device)
84 LIN controller (line control device)
M Meter (control unit)
CLH CAN communication line with higher communication rate (CAN)
CLL CAN communication line with lower communication rate (CAN)

I claim:

1. A communication control system, comprising:
at least one vehicle-mounted device;
at least one control unit configured to control the at least one vehicle-mounted device,
wherein said at least one vehicle-mounted device and said at least one control unit comprise vehicle-mounted devices and control units which are connected to each other by a first distance for serial communications with each other, and vehicle-mounted devices and control units which are connected to each other by a second distance for communications with each other via a controller area network (CAN),
wherein the first distance is less than the second distance; and
a plurality of CAN control units disposed in a meter and belonging to the CAN, each of the CAN control units having different communication rates,
wherein said vehicle-mounted devices and said control units are connected to said CAN control units and assigned to respective groups handled by said CAN control units, respectively, depending on the different communication rates,
wherein said vehicle-mounted devices and control units, which are connected to each other by the first distance for serial communications with each other, comprise a leveling unit and audio unit that function as hubs,
wherein the vehicle-mounted devices and control units, which are connected to each other by the first distance for serial communications with each other, have a lower communication rate of between 75 and 175 Kbps than the vehicle-mounted devices and control units, which are connected to each other by the second distance for communication via the CAN and have a higher communication rate of between 450 and 550 Kbps,
wherein said vehicle-mounted devices and control units, which function as hubs, comprise respective line control devices connected to each other, and one of said vehicle-mounted devices and control units which function as hubs comprises a CAN control unit for connection to said CAN,
wherein said vehicle-mounted devices and said control units which are mounted on the vehicle comprise at least one of a navigation device, an audio device, a meter device, an engine control device, and a control unit of a smart key device,
wherein said vehicle comprises a two-wheeled vehicle or a three-wheeled vehicle, and
wherein said one of said vehicle-mounted devices and control units which functions as hubs that comprises a CAN control unit for connection to said CAN and a line control device for communicating between hubs independent of the CAN control unit, is directly connected to one of another said vehicle-mounted devices and control units which function as hubs that does not comprise a CAN control unit for connection to said CAN.

2. A method, comprising:
providing at least one vehicle-mounted device;
providing at least one control unit configured to control the at least one vehicle-mounted device,
wherein said at least one vehicle-mounted device and said at least one control unit comprise vehicle-mounted devices and control units which are connected to each other by a first distance for serial communications with each other, and vehicle-mounted devices and control units which are connected to each other by a second distance for communications with each other via a controller area network (CAN),
wherein the first distance is less than the second distance; and
providing a plurality of CAN control units disposed in a meter and belonging to the CAN, each of the CAN control units having different communication rates;
connecting said vehicle-mounted devices and said control units to said CAN control units; and
assigning said vehicle-mounted devices and said control units to respective groups handled by said CAN control units, respectively, depending on the different communication rates,
wherein said vehicle-mounted devices and control units, which are connected to each other by the first distance for serial communications with each other, comprise a leveling unit and audio unit that function as hubs,
wherein the vehicle-mounted devices and control units, which are connected to each other by the first distance for serial communications with each other, have a lower communication rate of between 75 and 175 Kbps than the vehicle-mounted devices and control units, which are connected to each other by the second distance for communication via the CAN and have a higher communication rate of between 450 and 550 Kbps,
wherein said vehicle-mounted devices and control units, which function as hubs, comprise respective line control devices connected to each other, and one of said vehicle-mounted devices and control units which function as hubs comprises a CAN control unit for connection to said CAN,
wherein said vehicle-mounted devices and said control units which are mounted on the vehicle comprise at least one of a navigation device, an audio device, a meter device, an engine control device, and a control unit of a smart key device,
wherein said vehicle comprises a two-wheeled vehicle or a three-wheeled vehicle, and wherein said one of said vehicle-mounted devices and control units which functions as hubs that comprises a CAN control unit for connection to said CAN and a line control device for communicating between hubs independent of the CAN control unit, is directly connected to one of another said vehicle-mounted devices and control units which function as hubs that does not comprise a CAN control unit for connection to said CAN.

3. A communication control system, comprising:
at least one vehicle-mounted device;
control means for controlling the at least one vehicle-mounted device,
wherein said at least one vehicle-mounted device and said control means comprise vehicle-mounted devices and control means which are connected to each other by a first distance for serial communications with each other, and vehicle-mounted devices and control means which are connected to each other by a second distance for communications with each other via a controller area network (CAN),
wherein the first distance is less than the second distance; and
a plurality of CAN control means, disposed in a meter and belonging to the CAN, for controlling the control means, each of the CAN control means having different communication rates,
wherein said vehicle-mounted devices and said control means are connected to said CAN control means and assigned to respective groups handled by said CAN control means, respectively, depending on the different communication rates,
wherein said vehicle-mounted devices and control means, which are connected to each other by the first distance for serial communications with each other, comprise a leveling unit and audio unit that function as hubs,
wherein the vehicle-mounted devices and control means, which are connected to each other by the first distance for serial communications with each other, have a lower communication rate of between 75 and 175 Kbps than the vehicle-mounted devices and control means, which are connected to each other by the second distance for communication via the CAN and have a higher communication rate of between 450 and 550 Kbps,
wherein said vehicle-mounted devices and control means, which function as hubs, comprise respective line control devices connected to each other, and one of said vehicle-mounted devices and control means which function as hubs comprises a CAN control unit for connection to said CAN,
wherein said vehicle-mounted devices and said control means which are mounted on the vehicle comprise at least one of a navigation device, an audio device, a meter device, an engine control device, and a control unit of a smart key device,
wherein said vehicle comprises a two-wheeled vehicle or a three-wheeled vehicle, and
wherein said one of said vehicle-mounted devices and control means which functions as hubs that comprises a CAN control unit for connection to said CAN and a line control device for communicating between hubs independent of the CAN control unit, is directly connected to one of another said vehicle-mounted devices and control means which function as hubs that does not comprise a CAN control unit for connection to said CAN.

4. A control unit, comprising:
at least one controller configured to control at least one vehicle-mounted device,
wherein said at least one vehicle-mounted device and said controller comprise vehicle-mounted devices and controllers which are connected to each other by a first distance for serial communications with each other, and vehicle-mounted devices and controllers which are connected to each other by a second distance for communications with each other via a controller area network (CAN),
wherein the first distance is less than the second distance,
wherein the at least one controller is connected to one of a plurality of CAN control units disposed in a meter and belonging to the CAN,
wherein the at least one controller is assigned to at least one group handled by one of said CAN control units, respectively, depending on different communication rates,
wherein said vehicle-mounted devices and controllers, which are connected to each other by the first distance for serial communications with each other, comprise a leveling unit and audio unit that function as hubs,
wherein the vehicle-mounted devices and control units, which are connected to each other by the first distance for serial communications with each other, have a lower communication rate of between 75 and 175 Kbps than the vehicle-mounted devices and control units, which are connected to each other by the second distance for communication via the CAN and have a higher communication rate of between 450 and 550 Kbps,
wherein said vehicle-mounted devices and controllers, which function as hubs, comprise respective line control devices connected to each other, and one of said vehicle-mounted devices and controllers which function as hubs comprises a CAN control unit for connection to said CAN,
wherein said vehicle-mounted devices and said controllers which are mounted on the vehicle comprise at least one of a navigation device, an audio device, a meter device, an engine control device, and a control unit of a smart key device,
wherein said vehicle comprises a two-wheeled vehicle or a three-wheeled vehicle, and
wherein said one of said vehicle-mounted devices and controllers which functions as hubs that comprises a CAN control unit for connection to said CAN and a line control device for communicating between hubs independent of the CAN control unit, is directly connected to one of another said vehicle-mounted devices and controllers which function as hubs that does not comprise a CAN control unit for connection to said CAN.

5. The communication control system of claim 1, wherein the leveling unit comprises a CAN control unit for connection to said CAN and is directly connected to the audio unit which does not comprise a CAN control unit for connection to said CAN.

* * * * *